United States Patent Office 3,655,597
Patented Apr. 11, 1972

---

3,655,597
SINGLE-STEP PROCESS FOR PREPARING A CELLULAR PRODUCT HAVING A VERY COMPACT ELASTOMERIC SKIN
Albert Pierre Strassel, Ville d'Avray, France, assignor to Wyandotte Chemicals Corporation, Wyandotte, Mich.
No Drawing. Continuation of application Ser. No. 672,726, Oct. 4, 1967. This application May 4, 1970, Ser. No. 31,883
Claims priority, application France, Dec. 26, 1966, 88,838
Int. Cl. C08g 53/10
U.S. Cl. 260—2.5 AZ
2 Claims

ABSTRACT OF THE DISCLOSURE

Molded polyurethane-polyurea products having a cellular body with a thick, adherent skin having a high density are produced by a process in which the rate at which the various ingredients react is adjusted as a function of the quantity of water present in the ingredients.

CROSS-REFERENCE TO RELATED APPLICATION

This application is a continuation of U.S. Ser. No. 672,726, filed Oct. 4, 1967, and entitled "Single-Step Process for Preparing a Cellular Product Having a Very Compact Elastomeric Skin," now abandoned.

The present invention relates to an improved one-shot process for preparing rigid, semi-rigid or flexible polyurethanepolyurea products having a cellular portion and a compact portion which forms a heavy skin of at least 0.5 mm. thickness on the cellular portion. In one aspect, the invention relates to a process which provides a product having a skin of high density.

The process, as disclosed in copending Ser. No. 619,026, filed Feb. 27, 1967, involves the molding of a polyurethane-polyurea formulation with a catalytic system that furnishes a "creaming time" of the mixture of less than about 20 seconds, preferably less than about 10 seconds, and a rise time of less than about 60 seconds, preferably less than about 30 seconds. The term "creasing time" refers to the time which elapses between the time when the reaction products of the final polyurethane-polyurea composition are mixed and the start of expansion, while the rise time is the time which elapses between the start and the end of expansion in the mold.

Various catalytic systems which make possible the achievement of this result have been indicated in said application copending Ser. No. 619,026. The term "catalytic system" as used therein, refers not only to the catalyst or catalysts utilized, but also to the percentage in which they are present, the reactivity of the various constituents and the reaction temperatures.

As disclosed in said application copending Ser. No. 619,026, the general process for the production of polyurethane foams, which is utilized under specific conditions to obtain the desired products, comprises the reaction of a polyether-polyol and/or a polyester-polyol with an aromatic or aliphatic polyamine, an amino alcohol, a hydrazine or a hydrazide, and a polyisocyanate, in the presence of a catalyst composed of one or more metal-organic salts and/or one or more tertiary amines, and a pore-forming agent, with the reaction mixture being poured into a suitable mold.

Copending application U.S. Ser. No. 672,694 filed Oct. 4, 1967, now abandoned is concerned with a process in which quick-acting diamines are utilized. As disclosed therein, molded polyurethane-polyurea products having a thick skin without an apparent transitition zone of different density visible to the naked eye with the cellular body it covers are obtained in a one-shot process by mixing a polyol, an organic isocyanate and a quick-acting diamine which has been previously dissolved in the polyol. As used therein, the term "quick-acting diamine" refers to a primary or secondary aliphatic diamine or an aromatic diamine containing no negative group located in the ortho-position of the amino group. Examples of such diamines include the phenylene diamines, tolylene diamines, naphthylene diamines, hexamethylene diamines, 2,2,4′-trimethylhexamethylene diamines, o-tolidine, methylene dianiline, piperazine, 2-methylpiperazine, and other analogous diamines.

The disclosures of copending U.S. patent application Ser. No. 619,026 and of Ser. No. 672,694, now abandoned are incorporated herein by reference.

The products obtained by the processes of the above described copending applications have a cellular part and a compact part forming a thick skin, generally at least 0.5 mm. in thickness, on the cellular part. This skin adheres naturally to the cellular part with the two parts being separated by no transition zone of different density that is visible to the naked eye. Although it is not considered to be a part of the present invention, it can be explained that the thick skin is obtained by a judicious adjustment of the rates of reaction, gelation, and expansion, permitting the product which is in contact with the mold, to gel over a certain thickness before expansion while the heat of the system is eliminated from the mold and the reaction rate "blocks" the blowing agent in this thickness. On the other hand, at a great distance from the walls of the mold, the reaction can proceed normally by expansion and gelation in order to give rise to a foam.

It will be readily understood that the conditions in question can be realized relatively easily if the blowing agent is a low-boiling liquid, such as a chlorinated or chlorofluorinated compound or a cell-forming agent of any known type, but one which decomposes at a relatively low temperature, for example, at 40 to 80° C. On the other hand, if water is used either intentionally or accidentally as the blowing agent, as is the case, for example, if the more or less hydrophilic mixture of polyol and amine or amino alcohol is exposed to the atmosphere and absorbs moisture, or if water originating from atmospheric moisture, for example, is accidentally introduced during mixing of the polyol, the amine, the fillers, catalysts and blowing agents, then these traces or small quantities of water are found to be uniformly distributed in the foam at the time of casting and react with the isocyanate with the release of carbon dioxide gas in the entire mixture, including the part of the latter which is in contact with the mold.

If such is the case, and depending upon the other characteristics of the mixture and the operating conditions, it will be observed that a foam will be obtained which is either covered by an extremely thin molding skin (some ten microns), identical to that generally observed in all foams and therefore known as such, having a more or less high mechanical resistance which in some cases may be considered sufficient, or it is covered with a thin molding skin, the density of which, however, increases progressively from the interior to the exterior of the molded product in the immediate proximity of this skin, or, finally, the foam will be covered by a heavy skin of at least 0.5 mm. thickness which is visibly different from the cellular part and is more or less dense depending upon the quantity of water present.

It is certain in any case, that the presence of the thick skin constitutes an important advantage compared to the other cases. But in order to benefit from this advantage to the maximum, efforts must evidently be made to obtain the most compact skin possible which thus had the mechanical properties most closely resembling a compact elastomer of the same composition.

If the mixture cast in the mold contains only traces of water, such as, for example, 300 parts per million (abbreviated p.p.m. in the following), which practically calls for subjecting the polyol-amine-filler mixture to a preceding dehydration, for example, heating for 1 hour at 120° C. at a pressure of 3–10 mm. Hg, and if the other conditions described in copending Ser. No. 619,026 to form a thick skin are fulfilled, a foam will be obtained which is covered with a compact skin of a density close to that of a compact cast elastomer of the same composition but containing no blowing agent, with the density difference being possibly due to traces of water which the mixture will contain and also to small cells which are difficult to avoid, if only because air has been incorporated at the time of mixing of the constituents, for example, in the mixing head of the molding machine or at the outlet of this head.

If any process is used to transport each of the components separately to a mixing device after having proceeded such that the total quantity of water contained by the different components does not exceed 300 p.p.m., the result with regard to the quality of the skin will be identical.

In order to obtain the required low water content and the resulting compact skin, a molecular sieve can also be incorporated in the mixture or in the different constituents of the latter.

To the extent to which the mixture or one of the constituents contains an increasing quantity of water, it will be observed that a skin will be obtained which has a nearly equal thickness, provided, of course, that no other factor has been modified, but a decreasing density, followed by a skin with a density gradient in the proximity of the wall of the mold and thus with a sharper separation between the foam and skin. And if the quantities of water are still higher, only a very thin molding skin will be visible to the naked eye which is analogous to the skin generally obtained in all known foams produced without special precautions.

As indicated in copending Ser. No. 619,026, the purpose of the invention is not to obtain a simple skin which, although relatively strong, nevertheless remains sensitive to abrasion and tearing unless, of course, the subjacent foam has a high density. Nor is the purpose of the invention to obtain a progressive density increase in the proximity of the surface of the skin, while the latter nevertheless remains relatively thin; but rather, it is to lead to a very high density increase over a certain thickness which can range up to the theoretical density of a compact elastomer, with this skin then constituting a true protection of the foam which forms the internal part of the molded product, even if this foam is of low density.

It is an object of this invention to provide a process which produces a product having a cellular portion having a particularly strong and tightly adhering coating or skin on its surface.

Another object of the invention is to provide a product having a cellular portion with an adhering skin which possesses an optimum mechanical strength.

Another object of the invention is to provide a foam composition having a protective molding skin of such a strength that the density of the cellular portion can be reduced to a minimum.

According to the present invention, the quantity of water present in the composition introduced into the mold is reduced to a minimum, preferably to a proportion in the order of 300 p.p.m., or otherwise, the various characteristics of the "catalytic system" are adjusted as a function of the quantity of water present in the composition in order to obtain a thick skin having the best possible qualities. Broadly speaking, the present invention resides in an improvement in a process in which a mixture of ingredients comprising a polyisocyanate, a polyol selected from the group consisting of polyether-polyols and polyester-polyols, a non-aqueous blowing agent, and a diamine, the mixture containing an amount of water as an impurity, is poured into a mold and the ingredients react in said mold to form a polyurethane-polyurea composition having an inner cellular part and a compact outer part in the form of a thick skin adhering to the cellular part, the improvement comprising the step of adjusting the rate at which the ingredients react in accordance with the amount of water present in the mixture. In carrying out the process of this invention, the reactants are preferably utilized in the following amounts: The diamine in such a quantity that it provides for a $NH_2/OH$ ratio of about 0.3:1 to 5:1, the isocyanate in such a quantity that is provides for a $NCO/(OH+NH_2)$ ratio of about 0.8–1 to 2–1, the proportions of catalysts being about 0.05–2% and those of the blowing agent about 5–40% by weight of the reaction mixture. The temperature of the mixture generally ranges from 0–100° C. while the temperature of the mold varies from about 20° C. to 40° C. and higher.

A polyether-polyol or a polyester-polyl of any type can be used, or a mixture of such polyols, which are normally utilized for the production of polyurethane foams, including the polyols containing S, N or P atoms, provided that their average equivalent molecular weight amounts to between 1000 and about 2500, and advantageously in the order of 2000 to 2500.

As the organic isocyanate, those used customarily for the production of polyurethanes can be utilized, particularly the polymethylene diisocyanates and aromatic diisocyanates.

With regard to the catalysts, metallorganic salts may be used, as mentioned above, either separately or in mixtures, or a tertiary amine combined or not with these salts, as well as acids. Examples of such catalysts are disclosed in Ser. No. 619,026, the disclosure of which is herein incorporated by reference.

Finally, as a blowing agent, all the usual agents can be utilized, whether this be a chlorinated or chlorofluorinated liquid, of low boiling point or any type of cell agent. These blowing agents are well-known and examples of them are also given in said copending Ser. No. 619,026. However, for the above-indicated reasons, the use of water should be avoided.

As mentioned in said copending Ser. No. 619,026, additives can also be added to the mixture, such as wetting agents, fillers, pigments and common colorants.

For the application of the invention, the mixture of polyol, diamine and catalyst is allowed to react with the polyisocyanate in the presence of the blowing agent or agents in a mold of suitable shape with or without an external supply or removal of heat.

The temperature of the components, the nature and proportion of catalysts, the reactivity proper of the components are factors which modify the catalytic system. However, as will be readily understood, the nature, thickness and temperature of the mold also influence the quality of the heavy skin as a function of the quantity of water present in the system. One skilled in the art will be able to modify one or the other of the above-listed factors as a function of the quantity of water present in order to obtain a product with a skin having improved properties. In this regard the experimental results described below will serve as a guide in selecting proper conditions for obtaining the desired product.

For example, it has been found that 150 g. of a polyether polyol obtained by the propoxylation and ethoxylation of a trimethylolpropane with a molecular weight of 4500 or 6000, exposed to an atmosphere of 65% humidity in an open vessel of 80 mm. diameter for 1 hour at 22° C. absorb about 300 p.p.m. of water.

As shown in the following examples, quantities of water of this order already have an influence on the quality of the skin.

The examples which follow solely have the purpose of indicating the methods to obtain the desired result by listing specific compositions. These examples are intentionally limited to certain parameters without the description of others. It will easily be understood that it is sufficient to demonstrate the influence of the catalytic system by modifying the reactivity of one component without showing it with the other means, such as, for example, the nature and percentage of catalysts, the influence of which is perfectly well known.

A better understanding of the invention can be obtained by considering the following illustrative examples which are not intended, however, to be unduly limitative of the invention.

EXAMPLE 1

Five successive tests were carried out in the following manner:

Each time, 100 g. of a propoxylated and ethoxylated trimethylolpropane with a molecular weight of about 4500, 20 g. 3,3'-dichloro-4,4'-diaminodiphenylmethane, 1.5 g. lead naphthenate in 24% solution in white spirits, 1.5 g. triethylenediamine, 7.5 g. trichloromonofluoromethane ($CCl_3F$) and 7.5 g. methylene chloride were mixed. The necessary quantity of crude toluene diisocyanate to form a ratio of:

$$\frac{\text{NCO groups}}{\text{OH groups} + \text{NH}_2 \text{ groups}} = 1.10$$

was added to this mixture in the mixing head of a molding machine.

The polyol with a molecular weight of about 4500 was a conventional commercial product. The mixture of this polyol and the amine was previously dehydrated for 1 hour at 120° C. and 10 mm. Hg.

For the first test, this solution was used as such, while 500, 1000, 1500 and 1800 p.p.m. of water respectively, were added to the solution in the other four tests.

After pouring into a mold at 20° C. consisting of sheet metal of 1 mm. thickness, different foams were obtained which were covered by a skin of 2–3 mm. thickness.

After 8 days at ordinary temperature, these skins were cut so as to exhibit a thickness of about 1 mm. and were subjected to mechanical tests.

Table I indicates the mechanical properties of these skins as a function of the quantity of water which was previously added to the polyol-diamine mixture.

As can be seen, the presence of even small quantities of water considerably decreased the mechanical properties of the elastomeric skin covering the foam.

TABLE I

| Test | a | b | c | d | e |
|---|---|---|---|---|---|
| Quantities of water added, p.p.m. | 0 | 500 | 1,000 | 1,500 | 1,800 |
| Density (g./cm.³) | 0.86 | 0.77 | 0.57 | | |
| Rupture load (kg./cm.²) | 27 | 19 | 15 | 13 | 10 |
| Tear strength (kg./cm.) | 19 | 11 | 9 | 5 | 5 |

EXAMPLE 2

The same composition as in Example 1 was poured into a sheet-metal mold of 1 mm. thickness at 20° C. while adding increasing quantities of water in each test.

For one series of tests, the polyol-amine mixture was brought to 40° C. and for another to 25° C.

At 40° C., I observed the formation of a skin of 2–3 mm. thickness which is sharply distinct from the foam without a transition zone between the skin and the foam which would be visible to the naked eye, up to a quantity of water of 800 p.p.m., at 25° C., on the other hand, 500 p.p.m. cannot be exceeded in order to produce the same result.

This example shows that even a slight variation of the "catalytic system" (temperature of the products) permits the introduction of a more or less large quantity of water into the mixture while a skin of identical appearance is obtained: an increase of the reaction rate decreased the sensitivity to the presence of traces of water in the system.

It must be noted that a foam of lower density is obtained at 40° C. than 25° C., and consequently, the skin seemed to be optically more sharply distinct from the foam.

EXAMPLE 3

This example shows even more clearly the importance of the adjustment of the catalytic system:

100 g. of a propoxylated and ethoxylated trimethylolpropane of molecular weight of about 6000, 6.6 g. 3,3'-dichloro - 4,4' - diamino-diphenylmethane, 3 g. crude commercial o-tolylenediamine, 20 g. $CCl_3F$, 0.5 g. lead naphthenate and 0.5 g. triethylenediamine were mixed. Isocyanate is then added as indicated in Example 1 and the mixture was cast in the same manner into the same mold at the same temperature (20° C.).

As will be observed, the use of a "quick-acting" diamine in this mixture, i.e. o-tolylenediamine, permitted the reduction of the quantity of catalyst while leading to a higher reactivity of the system.

The formation of a thick skin was observed which was visibly sharply distinct from the subjacent foam, even when the quantity of water introduced into the mixture of polyol and amine reached 3000 p.p.m.

EXAMPLE 4

The composition described in Example 1 was poured into molds of the following different types:

Mold A: Sheet metal of 1 mm. thickness.
Mold B: Cast aluminum of 7 mm. thickness.
Mold C: Cast aluminum of 25 mm. thickness.
Mold D: Silicone rubber of 10 mm. thickness.

Table II indicates the maximum approximate quantities of water which can be introduced as a function of the nature of the molds and the temperature of the polyol-amine mixture.

TABLE II

| Mold at 25° C. | Temperature of mixture of polyol plus amine (° C.) | Maximum quantity of water (p.p.m.) [1] |
|---|---|---|
| A | 25 | 500 |
|   | 40 | 800 |
| B | 40 | 1,000 |
| C | 25 | 1,500 |
| D | 40 | 1,500 |
|   | 25 | 1,000 |

[1] To form a thick skin visibly distinct from the foam.

It was thus found that the results can be very different as a function of the nature and the thickness of the mold as well as according to the temperature of one of the components (polyol and amine).

EXAMPLE 5

In order to define the influence of the quantity of water on the quality of the thick skin even more clearly, the densities of the skin obtained by casting the composition as described in different molds as used in Example 4 either without the addition of water or with the addition of 1000 p.p.m. water were measured. The results are indicated in Table III. The mold reference letters are the same as those in Example 4.

TABLE III

| Mold | Temperature of polyol-amine mixture, °C. | Quantity of water added to previously dehydrated polyol-amine mixture (p.p.m.) | Density (g./cm.³) |
|---|---|---|---|
| A | 40 | 0 | 0.86 |
| B | 40 | 0 | 0.96 |
| D | 40 | 0 | 0.91 |
| A | 40 | 1,000 | 0.56 |
| B | 40 | 1,000 | 0.74 |
| D | 40 | 1,000 | 0.77 |
| A | 25 | 0 | 0.83 |
| C | 25 | 0 | 1.05 |
| D | 25 | 0 | 0.92 |
| A | 25 | 1,000 | 0.68 |
| C | 25 | 1,000 | 0.92 |
| D | 25 | 1,000 | 0.75 |

For example, the foams obtained had a density of 0.08 to 0.18 g./cm.³.

EXAMPLE 6

The compositions of Examples 1 and 3 were cast with the same temperatures of the products (25° C.) and into the same molds (Mold A of Example 4) at 25° C. with the addition of increasing quantities of water.

It was found as shown in Table IV, that the composition of Example 3, which is the most reactive, was less sensitive to a large increase of water in the mixture than that of Example 1.

TABLE IV

| Quantities of water added to the previously dehydrated polyol-amine mixture (p.p.m.) | Density of skin of the composition | |
|---|---|---|
| | Example 1 | Example 2 |
| 0 | 0.83 | 0.87 |
| 1,000 | 0.68 | 0.80 |
| 2,000 | 0.59 | 0.65 |
| 3,000 | | 0.59 |

It is to be understood that various changes and modifications may be made in the foregoing without departing from the spirit and scope of the invention.

What is claimed is:

1. In a process for preparing a molded integral skin polyurethane product having an inner cellular part and a compact outer part of from 0.5 mm. to 3.0 mm. in thickness adhered thereto with the two parts being separated by no transition zone of different density that is visible to the naked eye, said process comprising reacting in a mold a mixture of ingredients consisting essentially of
   (a) an organic polyisocyanate,
   (b) a polyol selected from the group consisting of polyether polyols and polyester polyols,
   (c) a non-aqueous blowing agent,
   (d) a diamine, and
   (e) a catalyst,
the improvement which comprises: utilizing said polyol and said diamine in admixture, said admixture having been dehydrated prior to reaction in said mold such that the total water content in said mixture of ingredients is a maximum of about 300 p.p.m.

2. The process of claim 1 wherein said polyol and said diamine are dehydrated by mixing said polyol and said diamine together and then heating the resulting mixture at a temperature of about 120° C. for a period of about one hour and at a pressure ranging from about 3 mm. to 10 mm. Hg to reduce the water content thereof to a miximum of about 300 p.p.m.

References Cited

UNITED STATES PATENTS

| 3,108,976 | 10/1963 | Knox. | |
| 3,154,521 | 10/1964 | Terek et al. | 260—75 |
| 3,475,803 | 11/1969 | Hill | 29—132 |
| 3,479,325 | 11/1969 | Blomeyer | 260—77.5 |
| 3,099,516 | 7/1963 | Henrickson | 18—48 |

FOREIGN PATENTS

| 1,448,751 | 8/1966 | France | 260—2.5 AZ |

OTHER REFERENCES

Bulletin 3004—Durez Plastics Div. of Hooker Chemical Corp., No. Tonawanda, New York, February 1961, pp. 1–14 only.

DONALD E. CZAJA, Primary Examiner

H. S. COCKERAM, Assistant Examiner

U.S. Cl. X.R.

260—2.5 BB, 2.5 AM